(12) United States Patent
Huang et al.

(10) Patent No.: US 7,672,747 B2
(45) Date of Patent: Mar. 2, 2010

(54) RECIPE-AND-COMPONENT CONTROL MODULE AND METHODS THEREOF

(75) Inventors: Chung-Ho Huang, San Jose, CA (US); Andrew Lui, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 45 days.

(21) Appl. No.: 11/693,664

(22) Filed: Mar. 29, 2007

(65) Prior Publication Data

US 2008/0243988 A1 Oct. 2, 2008

Related U.S. Application Data

(63) Continuation-in-part of application No. 09/539,313, filed on Mar. 30, 2000, now Pat. No. 7,356,580.

(51) Int. Cl.
*G06F 19/00* (2006.01)
*G06F 15/173* (2006.01)

(52) U.S. Cl. .................. 700/100; 700/121; 709/202

(58) Field of Classification Search ........... 700/97, 700/100, 108–110, 121, 99, 104, 175, 176; 709/201–203; 702/182–185, 35, 81–84; 705/8

See application file for complete search history.

(56) References Cited

U.S. PATENT DOCUMENTS

| | | | |
|---|---|---|---|
| 4,267,572 A | 5/1981 | Witte | |
| 4,365,303 A | 12/1982 | Coates et al. | |
| 4,490,806 A | 12/1984 | Enke et al. | |
| 4,645,348 A | 2/1987 | Dewar et al. | |
| 5,717,737 A | 2/1988 | Doviak et al. | |
| 4,734,909 A | 3/1988 | Bennett et al. | |
| 5,051,606 A | 9/1991 | Ikehara | |
| 5,113,344 A | 5/1992 | Kellogg et al. | |
| 5,119,498 A | 6/1992 | McNeill et al. | |
| 5,301,122 A | 4/1994 | Halpern | |
| 5,347,460 A | 9/1994 | Gifford et al. | |
| 5,386,567 A | 1/1995 | Lien et al. | |
| 5,403,621 A | 4/1995 | Jackson et al. | |
| 5,450,205 A | 9/1995 | Sawin et al. | |
| 5,546,322 A | 8/1996 | Gifford et al. | |

(Continued)

FOREIGN PATENT DOCUMENTS

AU    B-14185/88    10/1988

(Continued)

OTHER PUBLICATIONS

"International Search Report", Issued in PCT Application No. PCT/US2008/058320; Mailing Date: Aug. 29, 2008.

(Continued)

*Primary Examiner*—Charles R Kasenge
(74) *Attorney, Agent, or Firm*—IP Strategy Group, P.C.

(57) ABSTRACT

A recipe-and component control module (RACCM) is provided. The RACCM is a server for performing data management in a plasma processing system with a plurality of components. The RACCM includes a plurality of intelligent agents. Each intelligent agent of the intelligent agents is configured to interact with each component of the plurality of components. The RACCM also includes a coordinating agent, which is configured to receive processed data from the plurality of intelligent agents.

15 Claims, 8 Drawing Sheets

U.S. PATENT DOCUMENTS

| | | | |
|---|---|---|---|
| 5,553,220 A | 9/1996 | Keene | |
| 5,579,511 A | 11/1996 | Cavasa et al. | |
| 5,664,066 A | 9/1997 | Sun et al. | |
| 5,715,051 A | 2/1998 | Luster | |
| 5,757,483 A | 5/1998 | Pierce, III | |
| 5,831,851 A | 11/1998 | Eastburn et al. | |
| 5,937,365 A | 8/1999 | Friton et al. | |
| 5,977,913 A | 11/1999 | Christ | |
| 6,013,108 A | 1/2000 | Karolys et al. | |
| 6,032,109 A | 2/2000 | Ritmiller, III | |
| 6,077,386 A | 6/2000 | Smith, Jr. et al. | |
| 6,090,302 A | 7/2000 | Smith, Jr. et al. | |
| 6,091,749 A | 7/2000 | Hoffmaster et al. | |
| 6,138,241 A | 10/2000 | Eckel et al. | |
| 6,157,867 A | 12/2000 | Hwang et al. | |
| 6,204,768 B1 | 3/2001 | Kosugi et al. | |
| 6,225,901 B1 | 5/2001 | Kail, IV | |
| 6,233,492 B1 | 5/2001 | Nakamura et al. | |
| 6,243,738 B1 | 6/2001 | Hayles et al. | |
| 6,265,831 B1 | 7/2001 | Howald et al. | |
| 6,292,108 B1 | 9/2001 | Straser et al. | |
| 6,360,362 B1 | 3/2002 | Fichtner et al. | |
| 6,370,454 B1 | 4/2002 | Moore | |
| 6,411,994 B2 | 6/2002 | van Allen et al. | |
| 6,425,006 B1 | 7/2002 | Chari et al. | |
| 6,446,192 B1 | 9/2002 | Narasimhan et al. | |
| 6,473,664 B1 * | 10/2002 | Lee et al. | 700/110 |
| 6,493,756 B1 | 12/2002 | O'Brien et al. | |
| 6,501,377 B2 | 12/2002 | Ebata et al. | |
| 6,510,350 B1 | 1/2003 | Steen, III et al. | |
| 6,515,586 B1 | 2/2003 | Wymore | |
| 6,526,355 B1 | 2/2003 | Ni et al. | |
| 6,529,236 B1 | 3/2003 | Watanabe | |
| 6,535,123 B2 | 3/2003 | Sandelman et al. | |
| 6,553,336 B1 | 4/2003 | Johnson et al. | |
| 6,618,692 B2 * | 9/2003 | Takahashi et al. | 702/183 |
| 6,640,151 B1 | 10/2003 | Somekh et al. | |
| 6,782,302 B1 * | 8/2004 | Barto et al. | 700/121 |
| 6,862,557 B2 * | 3/2005 | Jones et al. | 702/187 |
| 6,865,522 B1 | 3/2005 | Gastiger et al. | |
| 7,016,811 B2 | 3/2006 | Peck et al. | |
| 7,113,838 B2 | 9/2006 | Funk et al. | |
| 7,123,980 B2 | 10/2006 | Funk et al. | |
| 7,146,237 B2 | 12/2006 | Lev-Ami et al. | |
| 7,254,458 B2 * | 8/2007 | Hasan | 700/121 |
| 7,283,882 B1 * | 10/2007 | Bransky et al. | 700/96 |
| 7,321,805 B2 * | 1/2008 | Yamada et al. | 700/121 |
| 7,337,183 B2 * | 2/2008 | Near | 702/183 |
| 7,356,580 B1 | 4/2008 | Huang et al. | |
| 7,404,207 B2 * | 7/2008 | Perry | 726/15 |
| 2003/0208448 A1 * | 11/2003 | Perry et al. | 705/64 |
| 2005/0131991 A1 * | 6/2005 | Ogawa et al. | 709/201 |
| 2005/0159911 A1 * | 7/2005 | Funk et al. | 700/121 |
| 2005/0171627 A1 * | 8/2005 | Funk et al. | 700/121 |
| 2005/0256669 A1 * | 11/2005 | Mitsui | 702/123 |
| 2008/0082579 A1 | 4/2008 | Huang et al. | |
| 2008/0082653 A1 | 4/2008 | Huang et al. | |

FOREIGN PATENT DOCUMENTS

| | | |
|---|---|---|
| AU | 9197198 | 3/1999 |
| AU | 3663099 | 11/1999 |
| BR | 8801840 | 11/1988 |
| BR | 9300032 A | 7/1993 |
| CA | 2082118 A1 | 7/1993 |
| CN | 1074767 | 7/1993 |
| CN | 1276072 | 6/2000 |
| DE | 3104178 A1 | 11/1981 |
| DE | 3812607 A1 | 10/1988 |
| DE | 4017902 A1 | 12/1990 |
| DE | 295039 A5 | 10/1991 |
| DE | 69330533 T | 9/2001 |
| DE | 69133240 T2 | 1/2004 |
| EP | 0373773 A1 | 6/1990 |
| EP | 0403117 | 12/1990 |
| EP | 0468803 B1 | 1/1992 |
| EP | 0490373 | 6/1992 |
| EP | 0552873 A1 | 7/1993 |
| EP | 0552873 B1 | 7/1993 |
| EP | 0584676 | 3/1994 |
| EP | 0677737 A2 | 10/1995 |
| EP | 1012683 A3 | 6/2000 |
| EP | 1105703 | 6/2001 |
| ES | 2160100 | 11/2001 |
| ES | 2160100 T3 | 11/2001 |
| FR | 2614122 | 10/1988 |
| FR | 2692701 | 12/1993 |
| GB | 2020009 A | 11/1979 |
| GB | 2070235 A | 9/1981 |
| GB | 2202062 | 9/1988 |
| GB | 2203869 | 10/1988 |
| JP | 56150331 A | 11/1981 |
| JP | 63279340 | 11/1988 |
| JP | 2139610 A | 5/1990 |
| JP | 3024608 A | 2/1991 |
| JP | 3030808 A | 5/1991 |
| JP | 1670092 | 6/1992 |
| JP | 4213715 A | 6/1992 |
| JP | 5265927 A | 10/1993 |
| JP | 6224098 | 8/1994 |
| JP | 3179997 A | 10/1995 |
| JP | 862141 A | 3/1996 |
| JP | 8021015 | 3/1996 |
| JP | 8062141 A | 3/1996 |
| JP | 2001512865 | 8/2001 |
| JP | 18-501680 A | 1/2006 |
| JP | 2006501680 | 1/2006 |
| KR | 10-2006-0086602 A | 8/2006 |
| KR | 20060086602 A | 8/2006 |
| WO | WO-8912274 | 12/1989 |
| WO | WO9908168 A2 | 2/1999 |
| WO | WO-9908168 A2 | 2/1999 |
| WO | WO-99/54694 A1 | 10/1999 |

OTHER PUBLICATIONS

"Written Opinion", Issued in PCT Application No. PCT/US2008/058320; Mailing Date: Aug. 29, 2008.

"Written Opinion", Issue in PCT Application No. PCT/US2007/079471; Mailing Date: Jan. 9, 2008.

"International Search Report", Issue in PCT Application No. PCT/US2007/079471; Mailing Date: Jan. 9, 2008.

"International Search Report", Mailed; Mar. 3, 2002, International Application No. PCT/US01/08667, Filed on Mar. 16, 2001, Applicants: Lam Research Corporation.

"International Search Report", Mailed: Apr. 19, 2002, International Application No. PCT/US98/16490, Filed on Mar. 19, 2001, Applicants: Lam Research Corporation.

"International Search Report", Mailed: Mar. 8, 1999, International Application No. PCT/US98/16490, Filed: Aug. 7, 1998, Applicants: DE Schrijver, Stefaan, A.

"Notice of Office Action ", Mailed Sep. 10, 2003, U.S. Appl. No. 09/539,313, filed Mar. 30, 2000, Inventors: Huang et al.

"Notice of Office Action", Mailed: Feb. 24, 2005, U.S. Appl. No. 09/539,313, filed Mar. 30, 2000, Inventors: Huang et al.

"Final Office Action", U.S. Appl. No. 09/539,313, Mailed: Oct. 19, 2005.

"Non Final Office Action", U.S. Appl. No. 09/539,313, Mailed: May 23, 2006.

"Final Office Action", U.S. Appl. No. 09/539,313, Mailed: Nov. 20, 2006.

Lee, et al., "Internet-Based Distributed Measurement and Control Applications", IEEE Instrumentation & Measurement Magazine, Jun. 1999, p. 23-27.

"Non Final Office Action", U.S. Appl. No. 09/539,313, Mailed: Feb. 24, 2005.

"Non Final Office Action", U.S. Appl. No. 09/539,313, Mailed: Aug. 26, 2004.

"Non Final Office Action", U.S. Appl. No. 09/539,313, Mailed: Sep. 10, 2003.

"Non Final Office Action", U.S. Appl. No. 09/539,313, Mailed: Apr. 7, 2003.

"Non Final Office Action", U.S. Appl. No. 11/536,585, Mailed: May 30, 2008.

Rutkowski, et al., "Smart Sensor Mesh: Intelligent Sensor Clusters Configuration and Location Discovery for Collaborative Information Processing", 2005, Academic Center for Computing and Media Studies, pp. 147-157.

"IEEE Standard for a Smart Transducer Interface for Sensors and Actuators-Transducer to Microprocessor Communication Protocols and Transducer Electronic Data Sheet (TEDS) Format", IEEE Standards Board, , Sep. 16, 1997, The Institute of Electrical and Electronics Engineers, Inc., IEEE Std 1451.2-1997, 1-114.

Lee, et al., "Internet-Based Distributed Measurement and Control Applications", IEEE Instrumentation and Measurement Magazine, vol. 2, No. 2, Jun. 1999, pp. 23-27.

"Control circuit for hot plugging a ROS cartridge", IBM Technical Disclosure Bulletin. vol, 29, No. 3, Aug. 1986, New York US pp. 1060-1062.

"Final Office Action, U.S. Appl. No. 09/539,313", Mailed: Mar. 10, 2004.

"Non Final Office Action", U.S. Appl. No. 11/536,585, Mailing Date Dec. 11, 2008.

Huang, et al., "U.S. Appl. No. 11/537,517", filed Sep. 29, 2006.

"International Preliminary Report on Patentability", Issued in PCT Application No. PCT/US2007/079471; Mailing Date: Apr. 9, 2009.

"International Search Report", Mailed: Jun. 3, 2002, International Application No. PCT/US01/08667, Applicants: Lam Research Corporation.

"International Search Report", Mailed: Apr. 19, 2002, International Application No. PCT/US01/08719, Applicants: Lam Research Corporation.

"International Search Report", Mailed: Mar. 8, 1999, International Application No. PCT/US98/16490.

Lee, et al., "Internet-Based Distributed Measurement and Control Applications", IEEE Instrumentation and Measurement Magazine, XP-001058265, Jun. 1999, pp. 23-27.

"IEEE Standard for a Smart Transducer Interface for Sensors and Actuators-Transducer to Microprocessor Communication Protocols and Transducer Electronic Data Sheet (TEDS) Format", IEEE Standards Board, , Sep. 16, 1997, The Institute of Electrical and Electronics Engineers, Inc., IEEE Std 1451.2-1997, 120 pages.

"International Preliminary Report on Patentability", Issued in PCT Application No. PCT/US2008/058320; Mailing Date: Oct. 8, 2009.

* cited by examiner

US 7,672,747 B2

RECIPE-AND-COMPONENT CONTROL MODULE AND METHODS THEREOF

PRIORITY CLAIM

This application is a continuation-in-part of a commonly assigned patent application entitled "Plug and Play Sensor Integration For A Process Module," by Huang et al., application Ser. No. 09/539,313 filed on Mar. 30, 2000 now U.S. Pat. No. 7,356,580, all of which is incorporated herein by reference.

BACKGROUND OF THE INVENTION

Advances in plasma processing have facilitated growth in the semiconductor industry. To create semiconductor devices, a process module has long been employed to perform substrate processing. Since semiconductor devices are usually delicate devices that may be proned to error, sensors may be attached to the process module to collect data for fault detection, identification of endpoints, and/or troubleshooting.

Consider the situation wherein, for example, a recipe is being executed in a plasma processing system. FIG. 1 shows a conceptual diagram illustrating how sensors may interact with a process module and how the sensors may utilize the process module for processing and coordination. A simplified processing environment may include a processing chamber 100 connected to a process module 102, which is connected to a plurality of sensors (104, 106, 108, and 110). Usually, data collected by each sensor may be uploaded to process module 102. In an example, data collected by the various sensors may be sent to process module 102 via a network path (e.g., ethernet path 112). Plurality of sensors 104, 106, 108, and 110 may be manufactured by different manufacturing companies. Accordingly, the plurality of sensors may most likely collect data at different time domains and may be unable to communicate with one another.

In recent years, the trend has been moving toward a feedback type of automated process control. Accordingly, more timely data is being required in order to detect endpoints, perform, fault detection, and to perform troubleshooting. As a result, the number of sensors being added to the plasma processing system has increased as more data is needed for processing. Although the increased number of sensors may be able to provide the software controlled process module with more data to perform its task, the increased volume of data that may be exchanged between the sensors and the process module may actually cause a drain on overall processing. In an example, the network path may become congested as the sensors compete with one another to send data to the process module. In another example, since process module 102, whose function is to manage substrate processing, is usually not designed to handle a massive inundation of data coming from a plurality of sensors, process module 102 may experience latency issue that may negatively impact the process module's main function of controlling substrate processing.

Furthermore, process module 102 may not have the processing capability and/or the memory capacity to handle unlimited number of sensors. In an example, another sensor module needs to be attached to the process module in order to provide additional detail. However, due to the processing power limitation and the memory capacity, process module 102 may not be able to handle another sensor. Accordingly, process module 102 may have to divert its limited resources from managing substrate processing to handling the additional sensor. In addition, latency may become a problem resulting in the process module being unable to handle the additional strain on its resources and may ultimately crash.

Besides storing the data from the plurality of sensors, process module 102 may also be employed to analyze the data. However, the analysis task may not only divert limited resources from the task of managing substrate processing, but may also require process module 102 to have access to the various different parts of a recipe that may be stored at the individual sensor. Unfortunately, the process module usually does not have access to these different parts of the recipe and may be unable to do a proper analysis of the data received.

In an example, a change has been made to the part of the recipe stored on sensor 104. In order to accommodate the change, the engineer may have to update the different modules (e.g., the sensor, the process module, etc.) with the change. In the likelihood that the change may not have been accounted for in one or more modules, the execution of the recipe may generate defective devices. In analyzing the data to determine the problem, process module 102 may need to be aware of the change in the recipe in order to perform a proper analysis. If the recipe is not readily available, the process module may either have to perform an incomplete analysis of the data or may have to retrieve the recipe from the sensor thereby expending unnecessary processing power to access the required data, thereby causing unnecessary data traffic congestion on a limited network pipeline In addition, "bad data" collected by a sensor may also impact the performance of process module 102. In an example, sensor 106 may have been damaged and as a result, have collected "bad data". When the data is uploaded to process module 102, the data may be utilized by process module 102 thereby negatively affecting substrate processing and may even negatively impact the other sensors.

In addition to processing the large amount of data that may he uploaded from the various sensors, process module 102 may also be responsible for integrating the data and coordinating the interaction between sensors. Each of the sensors may be unique with different data collection criteria. In an example, sensor 104 may collect data every 50 microseconds, whereas sensor 106 may collect data every 100 microseconds. Due to the differences between the sensors, such as data collection timing difference, the sensors are usually unable to communication with one another and may have to employ the process module to facilitate the exchange. Thus, the process module may be required to have the intelligence to handle these types of request.

Unfortunately, the process module may not always be able to handle the request, since the process module may not be able to integrate the data from the different sources. In an example, data from sensors 104 and 106 are collected at different time interval. To be able to integrate the data such that sensor 104 may be able to utilize the data collected by sensor 106, process module 102 may need the intelligence to match up the two sets of data. However, process module 102 may not have the processing power to handle such a complex operation. Also, integrating the two sets of data may be virtually impossible given that the data have been collected at different time domains.

Process module 102 has been originally created to manage substrate processing. Accordingly, process module 102 may not have the memory resource or the processing power to handle the additional task of data storage, data processing, data coordination, and the likes. As a result, the processing arid memory capability of process module 102 may be stretched. As the number of sensors attached to process module 102 grows, process module 102 may become a bottleneck as the process module tries to accommodate the demands from the various different sensors while trying to manage the processing chamber. Thus, the process module may begin to experience increased latency, may be unable to react quickly to changing execution environment, and may even experience a total shutdown.

BRIEF SUMMARY OF THE INVENTION

The invention relates, in an embodiment, to a recipe-and component control module (RACCM). The RACCM is a server for performing data management in a plasma processing system with a plurality of components. The RACCM includes a plurality of intelligent agents. Each intelligent agent of the intelligent agents is configured to interact with each component of the plurality of components. The RACCM also includes a coordinating agent, which is configured to receive processed data from the plurality of intelligent agents.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
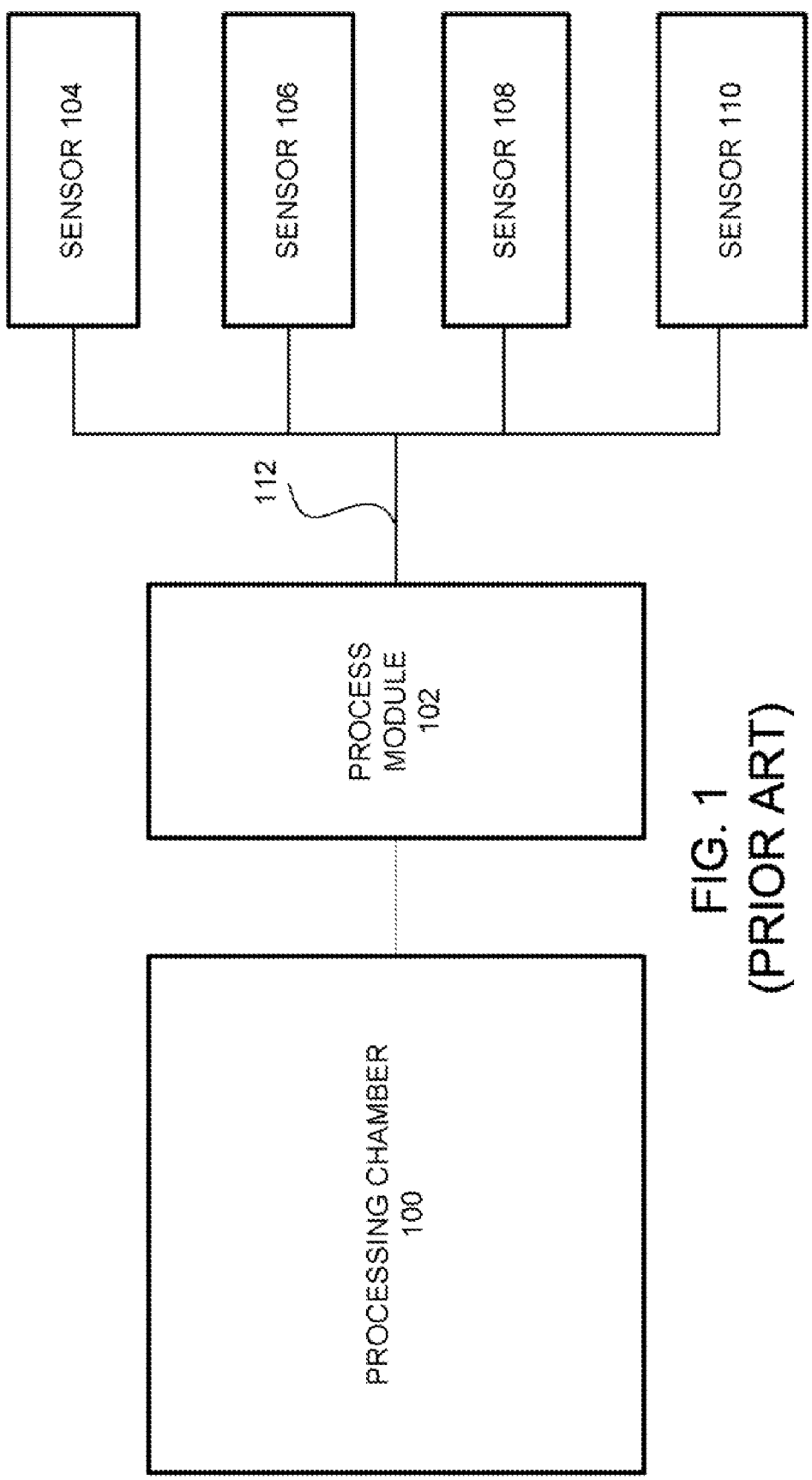
FIG. 1 shows a conceptual diagram illustrating how sensors may interact with a process module and how the sensors may utilize the process module for processing and coordination.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In one aspect of the invention, the inventors herein realized that a process module, in certain aspect, may behave in a similar manner as a sensor. In an example, both the sensor and the process module may collect data based on recipe parameters. Accordingly, a separate control module may be employed to perform tasks that the process module may have been performing for the sensors in the prior art. Therefore, the process module may focus on performing its main function of performing process control.

In accordance with embodiment of the present invention, an architectural arrangement is provided in which a recipe-and-component control module (RACCM) performs data management and/or recipe management for components attached to the processing system. As discussed herein, a component refers to a data-gathering element. Components may include, but are not limited to sensors, metrology tools, and process module. Since a process module may perform in a similar manner as a sensor in collecting data, the RACCM may treat both the process module and the sensor in a similar manner in regard to data management and/or recipe management.

In this document, various implementations may he discussed using sensors as an example. This invention, however, is not limited to sensors aid may include any data-gathering element, such as a metrology tool. Instead, the discussions are meant as examples and the invention is not limited by the examples presented.

In an embodiment of the invention, the RACCM is a modularised arrangement in which a component may be added, removed, or modified without impacting another component. In the prior art, each time a sensor is updated, the process module may also have to be reconfigured to accommodate the modified sensor. Accordingly, when the process module is being reconfigured, the other sensors, which are also coupled to the process module, may be negatively impacted since the process module may be unable to perform data management for the other sensors, Unlike the prior art, updating a sensor does not negatively impact any of the other components, especially the process module. Instead, the other components may be oblivious of the change that may be occurring.

In another embodiment of the invention, the RACCM may include a plurality of agents, such as intelligent agents, a coordinating agent, and a provisional agent that may perform data management and/or recipe management. Thus, the RACCM is able to distribute the workload across multiple agents. Unlike the prior art, in which the process module is performing most if not all of the data management tasks, the distribution of the workload allows data management to be handled quicker and more efficiently, in addition, the RACCM may include a plurality of processors. Thus, even if one agent is experiencing slower processing, the experience of one agent may not impact data processing for the other agents since the agents may be on a different processor.

In another embodiment of the invention, the RACCM may be a hierarchical architectural arrangement in that the workload may be dispersed based on the level of the agent. In an example, the RACCM may include a plurality of intelligent agents. The intelligent agents may be the lowest level of agents in that the intelligent agents interact directly with the components in configuring the components arid receiving data from the components. In comparison, the coordinating agent may be at the highest level. Thus, the coordinating agent may only receive summarized data from the lower level agents in order to perform data, analysis. In an embodiment, the analysis the coordinating agent perform may generate a composite signature that may provide instruction to the process module. Note that the number of levels that may exist in a RACCM may depend upon how the RACCM wants to distribute the workload. In an example, another level of agents may exist between the coordinating agent and the intelligent agents to reduce the workload on the intelligent agents.

In yet another embodiment of the invention, the RACCM may include a provisional agent for performing recipe management. Note that one or more provisional agents may be employed to perform this task, depending upon the implementation. In the prior art, different parts of the recipe may be located at various locations, such as at the process module, at the sensors, and the likes. Therefore, changes to a recipe usually require a multi-steps process of physically updating the recipe at various different locations. Unfortunately, forgetting to update one module may negatively impact substrate processing and may even result in defective devices. Unlike the prior art, the task of dispersing the modified recipe to the interested entities is a simple task of employing an editor interface to make the modification to the recipe. The modified recipe is then sent to the process module, which may then forward the modified recipe onward to the RACCM. Within the RACCM, the provisional agent may receive the modified recipe and may perform analysis to determine how the recipe may be distributed. By employing the provisional agent, recipe management may be centralized and handled automatically by one entity.

In an embodiment, the provisional agent may analyze the recipe to determine which sensor may need the parameters. Once the provisional agent has made the determination, the provisional agent may distribute parts of the recipes to the intelligent agents that may be associated with the sensors. In other words, the recipe is kept at the intelligent agents and not distributed to the components. By storing the recipe inside the RACCM, the RACCM may easily access the recipe to perform data analysis and data manipulation.

In an embodiment of the invention, the RACCM may offload part of the workload to the components. In the prior art, the sensors may not be selective in uploading the data to the process module. Unlike the prior art, the RACCM may send configuration requirements to the components providing the condition under which data may be uploaded. With the configuration requirements, the components may perform pre-processing to determine if the data meet the configuration requirements. Thus, the network is not unnecessarily congested with data that are not needed by the RACCM.

The features and advantages of the present invention may be better understood with reference to the figures and discussions that follow.

Figure 2:
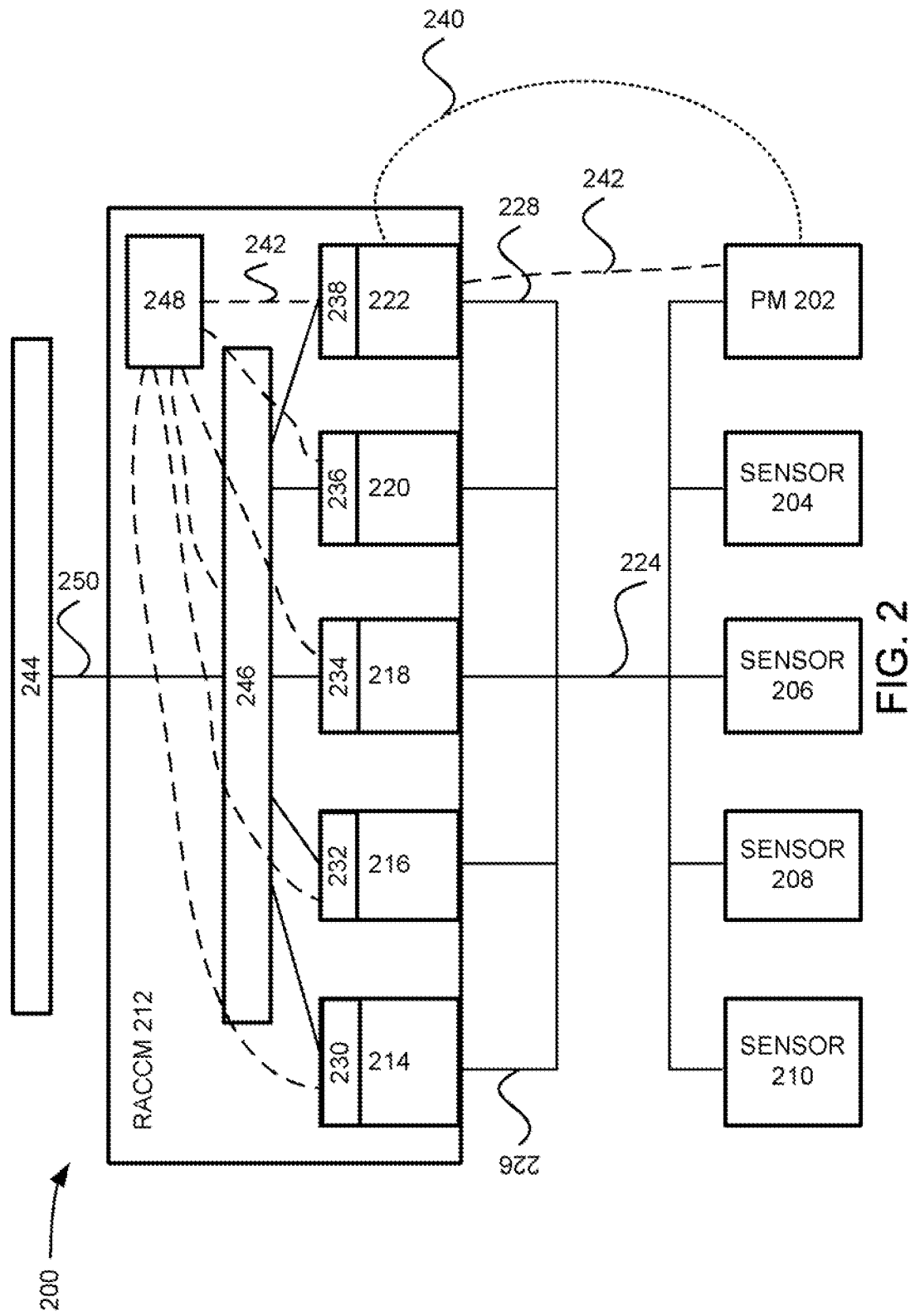
FIG. 2 shows, in an embodiment of the invention, a simplified overall architectural design of a recipe-and-component control module (RACCM).

FIG. 2 shows, in an embodiment of the invention, a simplified overall architectural design of a recipe-and-component control module (RACCM). A RACCM environment 200 may include a plurality of components, such as a process module 202 and a plurality of sensors 204, 206, 208, and 210. Unlike the prior art, the various different sensor are not coupled directly to process module 202. Instead the various different sensors are coupled to a RACCM 212. Hence, data are being sent to RACCM 212 instead of process module 202.

Additionally, in an embodiment, process module 202 is also coupled to RACCM 212. Unlike the prior art in which the process module may be responsible for collecting, handling, coordinating, and/or processing data, process module 202 in a RACCM environment may behave similarly to a sensor in that, process module 202 is also uploading data to RACCM 212. Thus, by removing the process module from the task of data management, the process module may focus on performing its main task of performing process control and may have sufficient bandwidth to respond in a timely and efficient manner to problems that may arise.

Since the process module is basically behaving in a similar manner as the sensors, the process module, in some aspect of the invention, may appear as another "component" to the RACCM. For ease of discussion, the term "component" will be used to refer to a data-gathering element in a plasma processing system. In an example, a component may include, but are not limited to, process modules, sensors, and metrology tools.

In an embodiment, RACCM 212 may be a computer system, such as a server. RACCM 212 may include one or snore processors for performing data management and/or recipe management, in an embodiment. The number of processors may depend upon the implementation of the RACCM. In an embodiment, RACCM 212 may also include memory. The amount of memory may be expanded easily and inexpensively given the storage requirement of the RACCM.

In an embodiment RACCM 212 may include intelligence for managing data and performing recipe management, in an example, RACCM 212 may include intelligence for configuring the conditions for accepting incoming data files, processing data, handling data requests, distributing recipes, and the likes. Unlike the prior art in which the intelligence for processing the data collected is handled solely by a process module, the intelligence for processing the data in RACCM 212 may be distributed among the various different agents within RACCM 212. In an embodiment, RACCM 212 may include a plurality of intelligent agents (214, 216, 218, 220, and 222), a coordinating agent 246 and a provisional agent 248. By distributing the intelligence among a plurality of entities, the workload may be distributed, thus enabling a more efficient processing environment. As a result, data traffic congestion and latency may reduce resulting in a more stable environment.

In an embodiment, RACCM 212 may include plurality of intelligent agents (214, 216, 218, 220, and 222). Each of the intelligent agents may be associated with a component (204, 206, 208, and 210). In an example, an intelligent agent 214 is associated with a sensor 210. In an embodiment, when data is uploaded to RACCM 212, sensor 210 may send data file along paths 224 and 226 to be received by intelligent agent 214. Similarly, process module 202 may also have a corresponding intelligent agent 222, which is configured to receive data sent by process module 202 along paths 224 and 228.

In an embodiment, each of the intelligent agents (214, 216, 218, 220, and 222) may have the intelligence to send configuration requirements to a corresponding component providing criteria for uploading data files. In the prior art, the sensors may upload data to the process module without pre-processing. Instead, the sensors tend to rely on the process module to perform data, analysis and manipulation. Unlike the prior art, part of the intelligence that may have previously resided at the process module may now be pushed down to the sensor level. In an example, the configuration requirements as provided by the intelligent agents may provide the sensors with the criteria for uploading data. By applying the configuration requirements, the sensors can perform pre-processing (e.g., determine what has changed) and provide the intelligent agents with only the data that the intelligent agents may want, thereby reducing network congestion.

In an embodiment, an intelligent agent may send configuration requirements directing a corresponding component to only send data at a time domain that is less than a process control rate. For ease of discussion, the term "time period" may also be employed to infer to a process control rate. Consider the situation wherein, for example, a process control rate is determined to be at every 125 microseconds. Intelligent agent 214 may send configuration requirements to sensor 210 instructing sensor 210 to send data at a time domain of every 100 microseconds. Thus, intelligent agent 214 has sufficient time to receive data from sensor 210 and to process the data before intelligent agent 214 may have to provide the data to a coordinating agent 246, which may be configured to gather and process the data from the various intelligent agents.

By configuring the time domain, the intelligent agent is able to control when a data file is received. In the prior art, to match up data files from each of the sensors may be a difficult, if not impossible, task since the data files may be collected at different time periods. However, embodiments of the invention may require the time domain to be at least once during a time period (process control rate). Thus, the plurality of data files that may be received in a single time period by the various intelligent agents may be matched in order to allow easier data sharing and more comprehensive analysis.

How often intelligent agents may request a data file may be individually programmed. In an example, sensor 210 may collect data even 50 microseconds. In an embodiment, an intelligent agent may request that a sensor upload data files as the data file is generated. In an example, intelligent agent 214 may opt to collect data as sensor 210 receives the data. In other words, sensor 210 may send an updated data file to intelligent agent 214 every 50 microseconds.

In another embodiment, an intelligent agent may request for a data file based on a multiplier. In an example, sensor 208 may collect, data every 25 microseconds. Thus, for each time period (process control rate of 110 microseconds), sensor 208 may generate at least 4 sets of data flies. Intelligent agent 216 may configure sensor 208 to only send data in a multiplier of 2 (e.g., every 55 microseconds). Therefore, sensor 208 may only send two data files, instead of the 4 data, files that may have been collected. For example, at every 55 microseconds, sensor 208 may send to intelligent agent 216 the most updated data file that has been generated.

In yet another embodiment, the intelligent agent may only collect once every time period. In an example, intelligent agent 214 may collect data every 100 microseconds. Any additional data files that may have been collected by sensor 210 may be disregarded by intelligent agent 214. In an embodiment, intelligent agent 214 may be unaware that additional data files may have been generated since intelligent agent 214 is only concerned about receiving a data file at every 100 microseconds. By controlling the time domain, data traffic congestion along the network path may be managed. In addition, by collecting data only when needed, processing power required to process each of the data files received from the components may be minimized. Thus, latency may be significantly reduced and network may become more reliable.

Besides sending configuration requirements with timing instruction, the intelligent agents may also send configuration requirements to the components with criteria defining the conditions for sending a data file. In an example, intelligent agent 214 may define minimum and maximum range for the parameters that are collected by sensor 210. For example, intelligent agent 214 may direct sensor 210 to only send a new data file if a parameter is outside a specific range. Accordingly, as long as the data being collected for the parameter is within the specific range, no new data file will have to be uploaded to intelligent agent 214.

By defining the conditions under which anew data file may be uploaded, the intelligent agent is able to minimize data traffic congestion along the network path (e.g., path 224). Also, intelligent agent is also able to reduce overhead cost, such as unnecessary memory usage and processing power usage for storing and processing data, that may provide little or no contribution to overall data analysis.

In an embodiment, the most recent data file received by an intelligent agent may be stored in a cache (230, 232, 234, 236, and 238) located in each intelligent agent. In another embodiment, the cache may store one or more data files (the most recent data files and a number of past data files). By having the data files stored in a cache, the data files are readily available for analysis and/or for sharing with the other agents (e.g., intelligent agents, coordinating agent, provisional agent, and the likes). In an example, by employing a cache, an intelligent agent is able to provide data to a requesting entity even if no new data has been uploaded.

In at embodiment if more than one data file has been received during a time period, only the most recent data file is shared. In an example, sensor 208 had sent two set of data files to intelligent agent 216, data stream a and data stream b, with data stream b being the newest data stream. When coordinating agent 246 requests a data file from intelligent agent 216, intelligent agent 216 may share the most recent data file (data, stream b) with coordinating agent 246.

RACCM 212 may also include provisional agent 248, which may be employed to accept the various different recipes and disperse the recipe among the various intelligent agents. Consider the situation wherein, for example, a recipe has been modified. Instead of manually updating the recipe at the various different sensors and process module, the recipe may be modified at a single centralized area. The updated recipe may be uploaded to a host, which may then share the updated recipe with process module 202. In an embodiment the process module may copy the portion of the recipe that is relevant to the processing model. In another embodiment, the process module may opt not to store any portion of the updated recipe. Regardless, the process module may then forward the updated recipe to provisional agent 248.

Provisional agent 248 may review the recipe and distribute different part of the recipe to the various agents (e.g., intelligent agents and/or coordinating agent). For example, the recipe may include different parameters. Each of those parameters may be relevant to one or more of the sensors. Provisional agent 248 may have the intelligence to determine which intelligent agent may need which part of the updated recipe. With provisional agent 248, recipe may be updated once and automatically distributed among the various agents.

Instead of storing the recipe at the different components (sensors, metrology tools, and/or process module), the recipe is now distributed across the agents. Unlike the prior art, the recipe is readily available to the intelligent agents in order to enable the intelligent agents to perform a comprehensive data analysis. In an embodiment the coordinating agent may include a high level copy of the entire recipe in order to facilitate data analysis. In an example, the portion of the recipe that may be stored at each intelligent agent may include the entire portion of the recipe that pertains to the sensor that may be associated with the intelligent agent. Since the coordinating agent does not need the details that the intelligent agents may need, the recipe that may be stored at the coordinating agent may include only portions of the recipe that may define how each parameter may relate to one another for recipe execution, in an example.

In an embodiment, each intelligent agent may have intelligence for performing different data-related tasks, such as data summarizing, endpoint detection based on the recipe stored on the intelligent agent, fault detection, arid the likes. In an example, once a data file has been received, the intelligent agent may perform data analysis to create a signature data that may summarize the data that has been collected for a particular time period. For example, based on a data file received and the recipe stored at intelligent agent 214, an endpoint has been detected. By assimilating the various data points, the intelligence agent may create a signature data that the intelligent agent may share. In an embodiment, each intelligent agent shares its signature with a coordinating agent. In an example, coordinating agent 246 may be configured to receive a signature data from each intelligent agent at each time period.

Accordingly, the intelligence that is distributed at the various intelligent agents may perform the analysis and provide the data that the coordinating agent may need. In an embodiment, upon receiving the plurality of signatures, the coordinating agent may analyze the various different data signatures based on the recipe stored at the coordinating agent to generate a composite signature. The composite signature may be shared with the components that may need the data In an embodiment, the coordinating agent may perform action based on the composite signature.

Since the coordinating agent is not overwhelmed with the plethora of data that may he uploaded to the RACCM, the coordinating agent is able to focus on data that is needed to determine the overall execution state of a recipe. As a result, the coordinating agent is able to respond quickly to potential problems. In an example, based on the set of signatures received from the intelligent agents, coordinating agent 246 is able to perform data, analysis against the recipe stored at the coordinating agent level to generate a composite signature that indicates a problem may exist in the current substrate processing. Thus, coordinating agent 246 may be able to respond quickly by sending a stop execution message to process module 202.

If the composite signature requires an immediate action from the process module, a dedicated channel, such as a dedicated channel 240, is provided to facilitate communication between coordinating agent 246 and process module 202. A dedicated channel may enable the coordinating agent to quickly notify the process module without having to deal with the potential traffic congestion on the common network path (e.g., path 224). In an embodiment, coordinating agent 246 may communicate with process module 202 along the common network path (path 224) if an immediate action from process module 202 is not required.

In an embodiment, the coordinating agent may also be employed to coordinate the sharing of data among the various intelligent agents. In an example, intelligent agent 214 may need data stored by intelligent agent 216. To request for the data, the intelligent agents may communicate with one another. However, if the data being requested is coming from a plurality of intelligent agents, retrieving the plurality of data from the coordinating agent instead of individually coordinating with the different intelligent agents may be more efficient, In yet another embodiment, the coordinating agent may also be employed to retrieve data that may be needed for performing troubleshooting. In an example, coordinating agent 246 may be connected to a computer system 244 that is employed for performing troubleshooting. When data is needed by troubleshooting computer system 244, a request may be sent to coordinating agent 246 via a path 250. Coordinating agent 246 may retrieve the requested data and send the data to the troubleshooting computer system.

As shown in FIG. 2, RACCM is a control module that is capable of handling data and recipe management for a processing system. Unlike the prior art, the process module is remove as the centralized module for collecting, handling, and coordinating data. Instead, the process module in the new RACCM environment may behave like one of the sensors in term of data and recipe management. In an embodiment, as more sensors are needed to enable more precise processing of a substrate, the RACCM may be modified relatively easy and inexpensively to have increased memory capacity and increased processing power. Since the RACCM may include a plurality of entities (e.g., intelligent agents, coordinating agent, provisional agent), the workload may be distributed so that a single entity is not unnecessarily burdened with performing all the tasks. By distributing workloads, data traffic congestion and latency that may have existed in the prior art may be significantly reduced providing a more stable network for data sharing and data analysis.

FIG. 3-8 shows, in embodiments of the invention, methods for implementing the RACCM.

Figure 3:
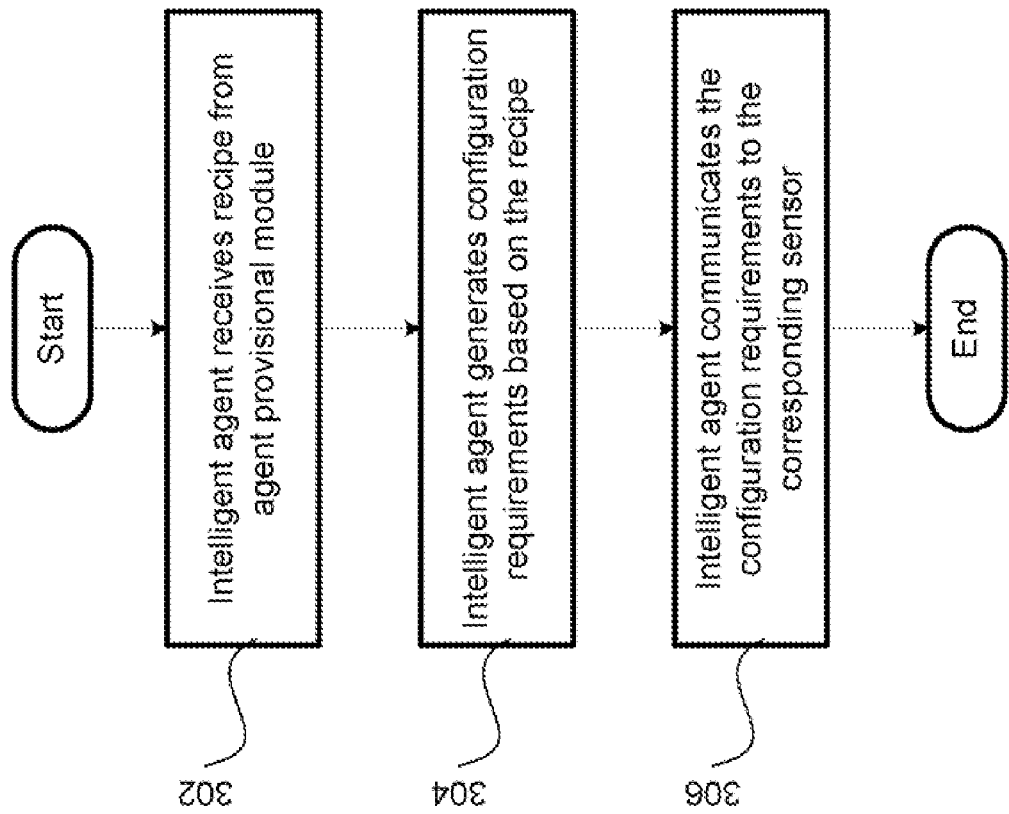
FIG. 3 shows, in an embodiment of the invention, a simple flow chart illustrating the steps for configuring a sensor.

FIG. 3 shows, in an embodiment of the invention, a simple flow chart illustrating the steps for configuring a sensor.

At a first step 302, an intelligent agent may receive the recipe from a provisional agent. As aforementioned, the provisional agent may perform recipe management by distributing the recipe to the entities that may need the recipe, in an embodiment, only a portion of the recipe may be distributed to any one particular entity. In an example, intelligent agent 214 may only need the portion of the recipe that pertains to parameters that sensor 210 may be associated with.

At a next step 304, the intelligent agent may generate configuration requirements based on the recipe. In an embodiment, configuration requirements may include criteria that define when a sensor may send data files to the intelligent agent, in an example, configuration requirements may include time domain (e.g., instruction on how often data files may be sent). In another embodiment, configuration requirements may include data conditions for sending data files to the intelligent agent. In an example, a data file may only be uploaded if the parameters are within a specified range.

At a next step 306, the intelligent agent may communicate the configuration requirements to the corresponding sensor. In an example, intelligent agent 214 may communicate with sensor 210 about the configuration requirements. In an embodiment, the sensor may have the intelligence to apply the configuration requirements to determine when a data file should be sent to the intelligent agent. In an example, configuration requirements may dictate that a data file be sent once every 100 microseconds. However, the sensor may collect data every 50 microseconds. The sensor may apply the configuration requirements and only send data files according to the configuration requirements even thought the sensor may have collected more often. In another example, the sensor may have collected a plurality of data files; however, the sensor may not upload the data files to the intelligent agent since the changes to the parameters may not have matched the configuration requirements.

By managing the data files transmission via configuration requirements, the intelligent agent in conjunction with the sensor is able to manage data traffic on the network. Unlike the process module in the prior art, the intelligent agent may be able to control the amount of data that are being uploaded by the sensor; thus, unnecessary data traffic congestion may be significantly reduced.

Figure 4:
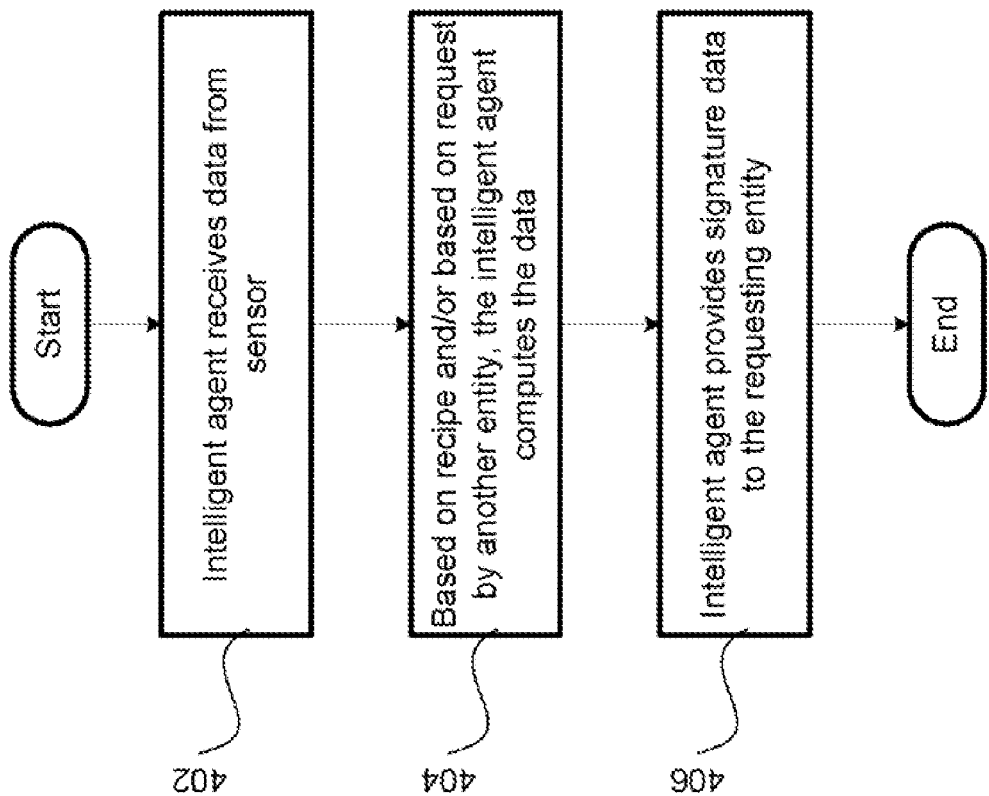
FIG. 4 shows, in an embodiment of the invention, a simple flow chart illustrating the steps for an intelligent agent to generate summary data from cache.

FIG. 4 shows, in an embodiment of the invention, a simple flow chart illustrating the steps for an intelligent agent to generate summary data from cache.

At a first step 402, an intelligent agent may receive data from a sensor. In an example, intelligent agent 214 may receive data files from sensor 210. In an embodiment, the data files being uploaded may be based on the configuration requirements (as discussed in FIG. 3). In another embodiment, the incoming data files may be stored in a cache. The cache may include one or more data files. In an example, the cache may include the most recent, data file and/or a plurality of recent data files. By storing the data files in the cache, the data files are readily available for analysis, data manipulation, and for sharing with requesting entities (e.g., coordinating agent, other intelligent agents, etc.).

In addition, by storing data in the cache, data latching may occur, in other words, if the sensor has not collected new data, a new data file will not be available to be uploaded to the intelligent agent. Thus, when a process module is requesting for updated data from the intelligent agent, the intelligent agent is still able to provide a data file to the process module, which is the data file currently stored at the cache (since no new file has been uploaded).

At a next step 404, the intelligent agent may compute the data, in an embodiment, the data computation may be based on a recipe stored at the intelligent agent. In another embodiment, data computation may be performed when another entity (e.g., coordinating agent) has requested for the data. In an example, coordinating agent may require signature data (e.g., endpoints, fault detection data, etc.) to be computed every 125 microseconds. Thus, upon receiving the data file, intelligent agent 214 may analyze the data received based on the recipe stored locally in order to create a signature that may be shared with coordinating agent 246.

At a next step 406, the intelligent agent may provide the data to the requesting entity. In an example, the intelligent agent may send signature data to the coordinating agent every 125 microseconds. In an embodiment, a data file may not be sent if an update to the data has not occurred. In an example, intelligent agent 214 has not received an updated data file from the sensor since the criteria for a new data file has not been met. Thus, when intelligent agent, has to provide the updated signature to coordinating agent 244 at the next request, intelligent agent 214 may not send an updated signature file. In an embodiment, the coordinating agent may include an intelligence that is able to conclude that the lack of an updated signature may indicate that the current signature has not changed.

Unlike the process module in the prior art, one single agent is not responsible for data management. Instead, by distributing the intelligence for data analysis, data manipulation, and data coordination among a plurality of agents, the workload is distributed among many different entities. Thus, more efficient data management may be achieved through the coordination of multiple agents. In addition, by having the intelligent agents perform data management, the process module may be relieved of the responsibility aid may instead focus on the main task of managing the process control.

Figure 5:
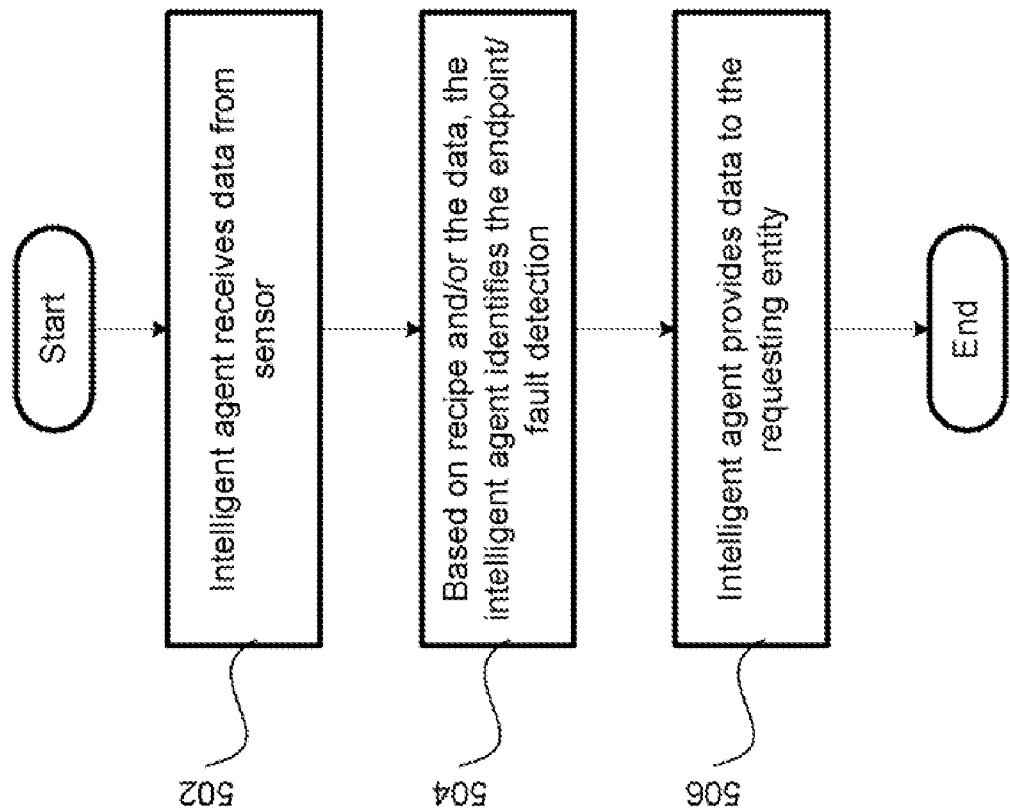
FIG. 5 shows, in an embodiment of the invention, a simplified flow chart illustrating steps for an intelligent agent to generate endpoints and/or fault detection data.

FIG. 5 shows, in an embodiment of the invention, a simplified flow chart illustrating steps for an intelligent agent to generate endpoints and/or fault detection, data.

At a first step 502, an intelligent agent may receive data from a sensor. In an example, intelligent agent 214 may receive data files from sensor 210. As aforementioned, the data files being uploaded may be based on the configuration requirements (as discussed in FIG. 3).

At a next step 504, the intelligent agent may analyze the data file to identify an endpoint and/or fault detection. In an example, based on the recipe stored locally, intelligent agent 214 may be able to identify an endpoint based on the data files received. In another example, intelligent agent may analyze the data files to perform fault detection. In an embodiment, performing fault detection may include comparing the data received against the recipe stored locally at the intelligent agent.

At a next step 506, the intelligent agent may provide the endpoint and/or fault detection data to the requesting entity. In an embodiment, the data that is sent from an intelligent agent to a coordinating agent may be summarized data (e.g., signature file, endpoints, etc.). In other words, the coordinating agent is receiving a summary of the data that has been collected from the sensor; thus the amount of data being sent upstream is far less because the intelligent agent has already performed data analysis and data manipulation. In an example, instead of sending the full data files, intelligent agent 214 may send only the endpoint to coordinating agent 246.

Upon receiving the endpoint, coordinating agent may compare the endpoint against the recipe that is stored locally, in an embodiment, the recipe stored at the coordinating agent may include recipe that may be stored at the plurality of intelligent agents. However, the coordinating agent may not store, in details, the full recipe that may be stored at each intelligent agent. Instead, the coordinating agent may store only a small portion such that the coordinating agent may be able to perform a high-level combination analysis. In an example, the coordinating agent may store enough of the recipe to help the coordinating agent make a determination if the supposed endpoint received from intelligent agent 214 is actually an endpoint or does the coordinating agent need to request for more data.

Unlike the prior art, the process module is not responsible for analyzing the data, to identity endpoints and/or perform fault detection. Instead, the task may be distributed among a plurality of agents capable of analyzing the data based on the recipe stored locally to determine endpoint fault detection data. Again, by distributing the intelligence for identifying endpoints and/or performing fault detection, the workload is distributed among many different agents. Also, data traffic congestion on the network may be significantly reduced since the plurality of intelligent agents is able to handle a higher volume of data than a single process module. Thus, a more stable network environment may exist and the process module may focus on the task of performing process control.

Figure 6:
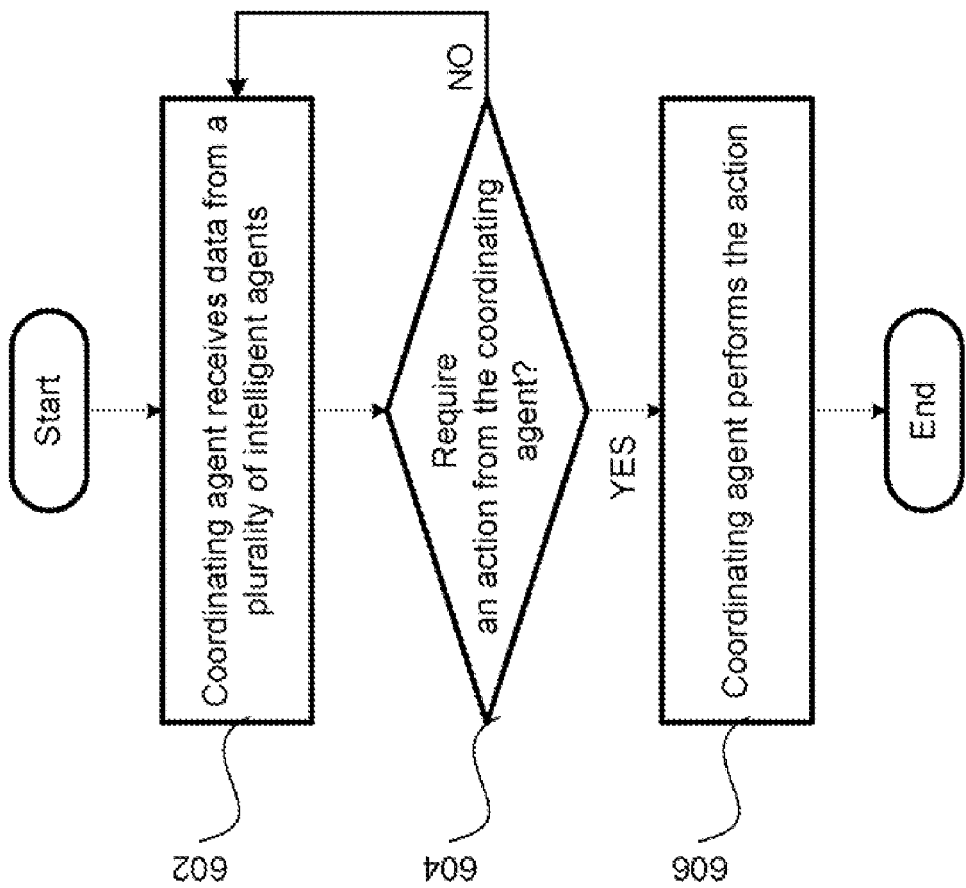
FIG. 6 shows, in an embodiment of the invention, a simplify flow chart illustrating the steps for a coordinating agent to perform, data analysis.

FIG. 6 shows, in an embodiment of the invention, a simplify flow chart illustrating the steps for a coordinating agent to perform data analysis.

At a first step 602, a coordinating agent may receive data from a plurality of intelligent agents. In an embodiment, the data that is being uploaded to the coordinating agent may be summarized data, such as endpoint, fault detection data, and the likes.

At a next step 604, the coordinating agent may make a determination on whether an action is required to be performed. In an embodiment, based on the recipe stored locally at the coordinating agent, the coordinating agent may produce an output. In an example, coordinating agent 246 may analyze the data being sent by the plurality of intelligent agents to determine if one or more endpoints may have actually been identified. In another example, coordinating agent 246 may perform further analysis of the data based on the recipe that is stored locally in order to produce a composite signature.

If an action is required, at a next step 606, the coordinating agent may perform the action. In an example, if an endpoint has been identified, the coordinating agent may have to perform one or more actions. For example, the coordinating agent may have to notify the process module about the endpoints. In another example, the composite signature may indicate that a problem may exist and that the process module must cease operation. In an embodiment, if the action is not critical, the coordinating agent may notify the process module via the corresponding intelligent agent. However, if the action is critical, the coordinating agent may notify the process module directly via a dedicated channel, such as dedicated channel 240, If an action is not required, the coordinating agent may proceed back to step 602 to continue receiving data from the plurality of intelligent agents.

Since the data being received by the coordinating agent is a summary of the data that has been sent by the sensors, the coordinating agent is not overwhelmed with a large volume of data that the coordinating agent may not need to perform data analysis. Accordingly, the coordinating agent is able to perform data, analysis quickly and is able to readily respond to any request and/or potential problem that may be identified. Thus, the coordinating agent is able to offload tasks from the process module, such as coordination and data analysis.

Figure 7:
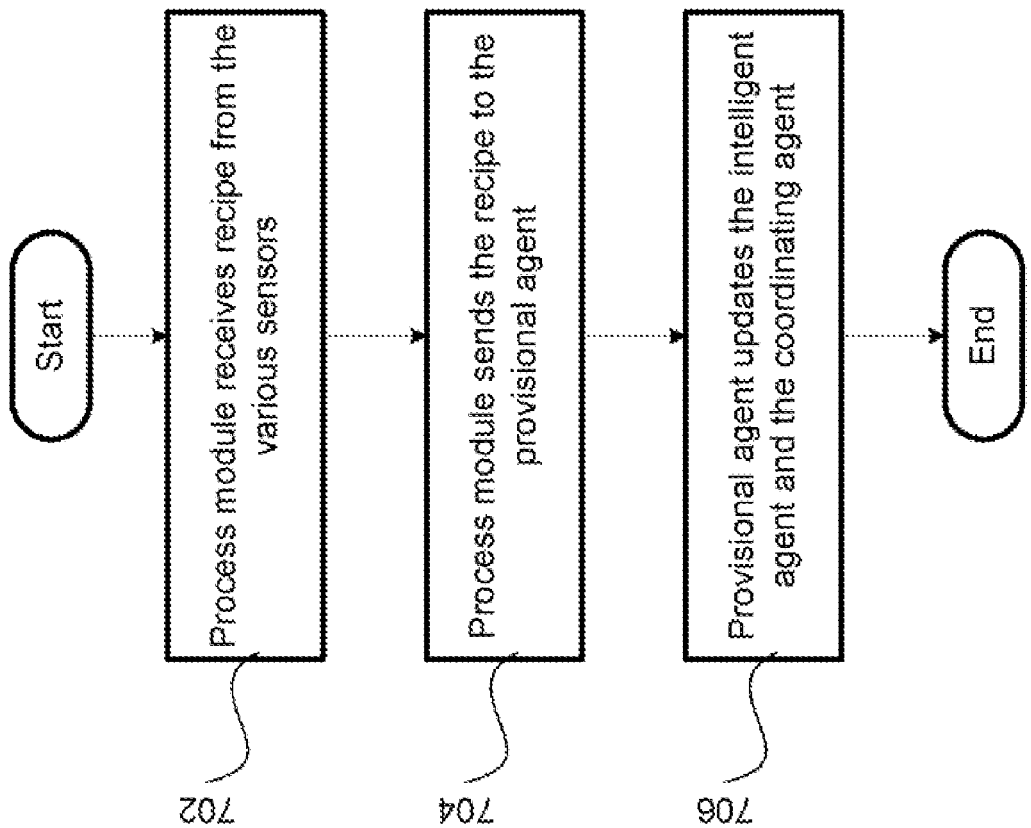
FIG. 7 shows, in an embodiment of the invention, a simplified flow chart illustrating the steps for distributing the recipe among the different entity of a RACCM via a provisional agent.

FIG. 7 shows, in an embodiment of the invention, a simplified flow chart illustrating the steps for distributing the recipe among the different entity of a RACCM via a provisional agent.

At a first step 702, a recipe is loaded onto the process module. Consider the situation wherein, for example, a recipe has been changed. In the prior art, a change to a recipe may require the change to be individually updated at different components (e.g., at one or more sensors, at the process module, etc.). Unlike the prior art, the change is updated at a centralized location. The updated recipe is then uploaded onto the process module.

At a next step 704, the process module may upload the recipe to a provisional agent. In an embodiment, process module 202 may upload the modified recipe to the corresponding intelligent agent. In an example, process module 202 may upload the recipe to intelligent agent 222. Upon receiving the recipe, intelligent agent 222 may forward the recipe to provisional agent 248. In an example, intelligent agent 222 may send the modified recipe along a path 242 to provisional agent 248.

At a next step 706, the provisional agent may distribute the recipe among the various different agents within the RACCM. In an embodiment, the recipe may be distributed based on the relationship between the agents (intelligent agents/coordinating agent) and the components, in an example, intelligent agent 222 is associated with process module 202. Accordingly, intelligent agent 222 may only receive part of the recipe that is required by process module 202.

By having the recipe stored and managed by the RACCM, recipe updates may be performed quickly. Unlike the prior art, the recipe is updated once, thereby minimizing the risk of human error. Further, the task of distributing the recipe may be automated, thereby reducing the possibility of an update not being performed on one of the components. Realistically, the recipe is no longer required to be distributed to the various components since the recipe residing at the intelligent agents, which provide the configuration requirements to the components.

By distributing the recipe across a plurality of agents within the RACCM, the recipe is available to the different entities that may have to perform data, manipulation and data analysis. In an example, intelligent agent 222 is performing data analysis. However, to perform an accurate analysis, intelligent agent 222 may need access to the recipe stored at intelligent agent 214. Since the recipe is stored locally within the RACCM, intelligent agent 222 may easily communicate with intelligent agent 214 to retrieve the required recipe.

Figure 8:
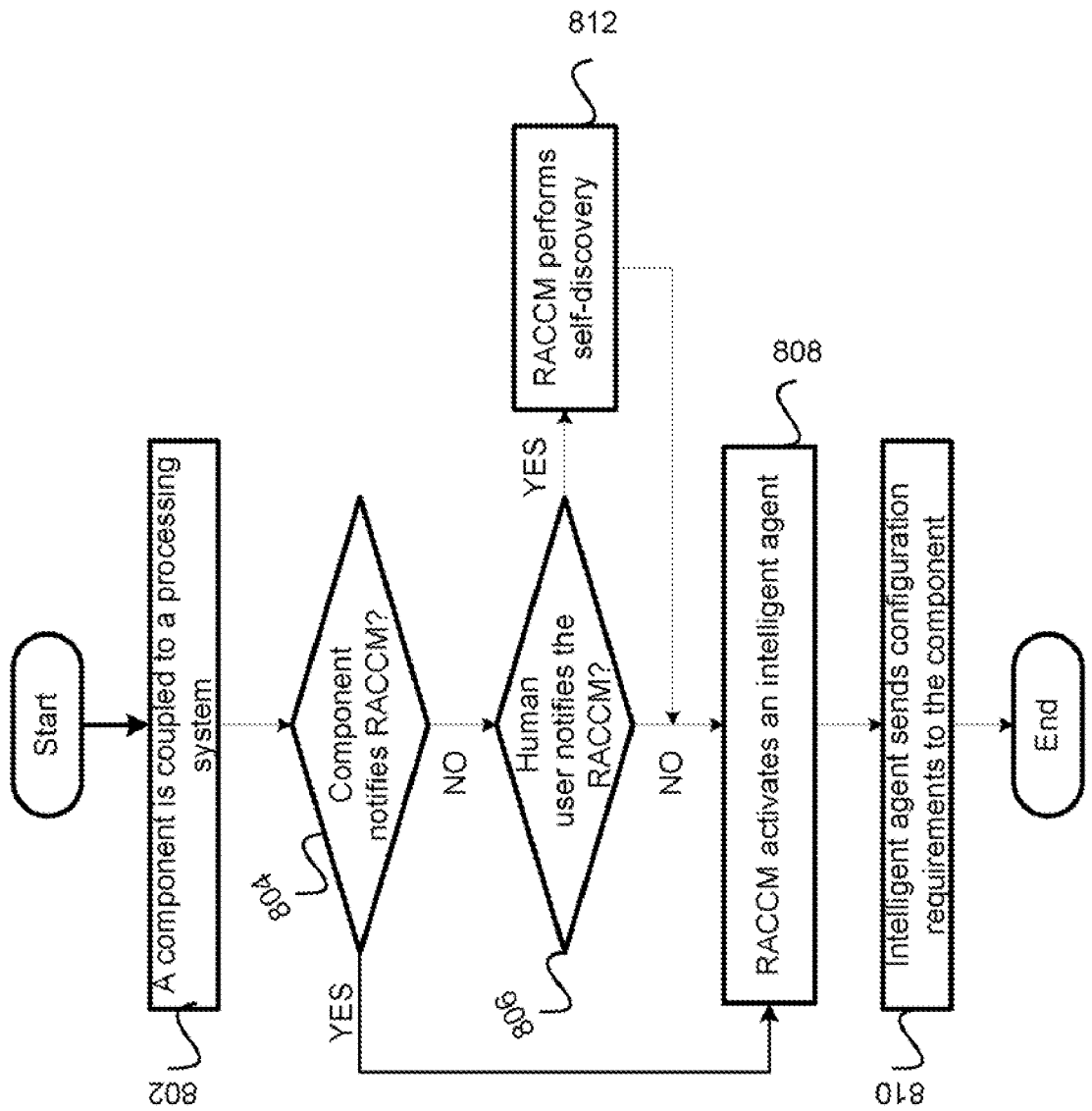
FIG. 8 shows, in an embodiment of the invention, a simple flow chart illustrating the steps for associating a component with an intelligent agent.

FIG. 8 shows, in an embodiment of the invention, a simple flow chart illustrating the steps for associating a component with an intelligent agent.

At a first step 802, a component is attached to a processing system. Consider the situation wherein, for example, a new sensor has been attached to a processing system. In an embodiment, a sensor may announce its presence when the sensor is first connected to a RACCM. The presence of the new sensor may be made known to the RACCM by at least three different methods.

At a next step 804, the method determines whether or not the component notifies the RACCM. In an embodiment, a component may send a reporting data package to the RACCM In an example, a sensor 210 may send a reporting data package to RACCM 212. The reporting data package may include profile data about the sensor.

At a next step 808, the RACCM may activate an intelligent agent. Upon receiving the reporting data package, RACCM, 212 may analyze the reporting data package to identify the sensor that wants to commence communication. In an embodiment, RACCM may include a plurality of intelligent agents even though one or more of the plurality of intelligent agents may remain inactive. In an example, a RACCM may include 100 intelligent agents, each of the intelligent agents is inactive until a sensor has been connected to the RACCM.

In an embodiment the RACCM may activate an intelligent agent and associate that intelligent agent with the requesting sensor. In an embodiment, the intelligent agent classes may be loaded into RACCM at startup. When a sensor first announces its presence, the RACCM will instantiate an intelligent agent object from the associated intelligent agent class. Once the intelligent agent object is instantiated, the intelligent agent may begin initiating the communication sequence to the targeted sensor.

In an example, intelligent agent 214 may remain inactive until RACCM 212 has assigned intelligent agent 214 to sensor 210. In an embodiment, once an intelligent agent has been activated, a provisional agent may send recipe that may be associated with the new sensor. In an example, sensor 210 has been added to the processing system. About the same time, the recipe may have been modified to account for new parameters that sensor 210 will be collecting data. The modified recipe may have been loaded onto provisional agent 248, which may then distribute to intelligent agent 214 the recipe portion that may relate to sensor 210.

At a next step 810, the intelligent agent may send configuration requirements to the component. In an example, once intelligent agent 214 has been activated, intelligent agent may proceed with sending configuration requirements (e.g., time domain, data stream conditions, etc.) to sensor 210. Since the intelligent agent has already been pre-loaded into the RACCM, a sensor may have plug-and-play capability in that the sensor may be activated almost immediately when the sensor connects to the processing system.

Referring back to step 804, if the component is not capable of automatically announcing its presence to the RACCM, then at a next step 806, a human user may notify the RACCM. In an example, a technician has connected sensor 210 to a processing system.

At a next step 808, the RACCM may activate an intelligent agent. In an example, the technician may download an intelligent agent that may correspond with the sensor onto RACCM 212 in order to enable RACCM 212 to communicate with sensor 210. In an example, intelligent agent 214 may be downloaded to RACCM 212. In other words, if the component is not capable of automatically announcing its presence to the RACCM, the technician may manually instantiate an intelligent agent object from the associated intelligent agent class. Once the intelligent agent object is instantiated, it will initiate the communication sequence to the targeted sensor.

Similar to above (step 810), once the intelligent agent 214 has been activated, intelligent agent may proceed with sending configuration requirements (e.g., time domain, data stream conditions, etc.) to sensor 210. Advantageously, by only maintaining active intelligent agents, the memory requirement for the RACCM may be minimized.

Referring back to step 806, if human intervention does not occur, then the RACCM may perform self-discovery, at a next step 812. Consider the situation wherein, for example, a new sensor has been connected to the processing system. However, the sensor may not have the capability to send a self-reporting data package and no human intervention may have occurred. In an example, sensor 210 has been added to the processing system. However, sensor 210 has no way of announcing its presence to RACCM 212.

In an embodiment the RACCM may have a self-discovery feature that may enable the RACCM to periodically check the processing systemic determine if a change (e.g., new sensor, change to the processing system, etc.) has occurred. In another embodiment, the self-discovery feature may include an interrupt event that may be employed to notify the RACCM when a change has occurred to the processing system. Once the RACCM has determined that anew sensor has been added to the processing system, the RACCM may establish a communication with the new sensor to profile the sensor.

At a next step 808, once the profiling has been performed, the RACCM may activate an intelligent agent that may correspond with the new sensor. The intelligent agent may already reside in the RACCM, in an embodiment. In another embodiment, the RACCM may have to download the intelligent agent. With self-discovery, the RACCM has the versatility to handle different types of sensors (e.g., self-reporting sensor, non self-reporting sensor, etc.).

As can be appreciated from the foregoing, embodiments of the present invention substantially reduces the burden of data management from the process module. By employing a RACCM, an architectural arrangement is created in which the process module seemingly becomes just another component that may benefit from the RACCM's functionality. With the RACCM, latency and data traffic congestion within the network may be significantly decreased as data management is distributed across different agents and components. Further, a more comprehensive data analysis may be performed as data and/or recipe are shared among the agents. By relieving the process module from the lime consuming and complicated task of data management, the task of process control and data management is no longer competing with one another for the same resources.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A plasma processing system comprising a program storage medium, said program storage medium having a plurality of agents embodied therein for performing data management in said plasma processing system, said plasma processing system having or being coupled with a plurality of components, said plasma processing system comprising:

a plurality of intelligent agents, each intelligent agent of said intelligent agents being configured to interact with a component of said plurality of components, said plurality of intelligent agents including at least a first intelligent agent and a second intelligent agent, said plurality of components including at least a first component and a second component, said first intelligent agent being configured to receive first data from said first component according to a first set of criteria, said first component being configured to collect second data according to a second set of criteria, said second intelligent agent being configured to receive third data from said second component according to a third set of criteria, said second component being configured to collect fourth data according to a fourth set of criteria, said first set of criteria being different from said second set of criteria, said first set of criteria being different from said third set of criteria, said third set of criteria being different from said fourth set of criteria, said first data being a subset of said second data, said third data being a subset of said fourth data;

a coordinating agent, said coordinating agent being configured to receive processed data from said plurality of intelligent agents; and a set of provisional agents, said set of provisional agents being configured to perform recipe management, said recipe management including distributing at least part of a recipe to at least one of said plurality of intelligent agents and said coordinating agent, wherein said each intelligent agent of said plurality of intelligent agents includes intelligence for defining configuration requirements for said component of said plurality of components, said configuration requirements including criteria for sending a data file to said each intelligent agent of said plurality of intelligent agents, said criteria being based on said part of said recipe being stored locally at said each intelligent anent of said plurality of intelligent agents.

2. The plasma processing system of claim 1 wherein said plurality of components employing said condition requirements to perform pre-processing on said data file prior to sending said data file to said plurality of intelligent agents.

3. The plasma processing system of claim 1 wherein said each intelligent agent of said plurality of intelligent agents includes a cache, said cache being configured to save at least a data file in order to enable data latching.

4. The plasma processing system of claim 1 wherein said each intelligent agent of said plurality of intelligent agents performs data analysis of a data file to generate a signature data, said signature data being summarized data for said data file.

5. The plasma processing system of claim 4 wherein said coordinating agent is configured to receive said signature data from each intelligent agent of said plurality of intelligent agents, said coordinating agent performing data analysis to generate a composite signature.

6. The plasma processing system of claim 5 wherein said coordinating agent includes intelligence for providing instruction to said plurality of components based on said composite signature.

7. The plasma processing system of claim 1 wherein said plurality of components including at least one of a process module, a sensor, and a metrology tool.

8. The plasma processing system of claim 1 wherein said plasma processing system includes intelligence for performing self-discovery to identify changes to said plasma processing system, said self-discovery including identifying when a component of said plurality of components is being connected to said plasma processing system.

9. An article of manufacture comprising a program storage medium having computer readable code embodied therein, said computer readable code being configured to perform data management for a plasma processing system, comprising:
    code for providing a server, wherein said server including
        a plurality of intelligent agents, each intelligent agent of said intelligent agents being configured to interact with a component of said plurality of components, said plurality of intelligent agents including at least a first intelligent agent and a second intelligent agent, said plurality of components including at least a first component and a second component, said first intelligent agent being configured to receive first data from said first component according to a first set of criteria, said first component being configured to collect second data according to a second set of criteria, said second intelligent agent being configured to receive third data from said second component according to a third set of criteria, said second component being configured to collect fourth data according to a fourth set of criteria, said first set of criteria being different from said second set of criteria, said first set of criteria being different from said third set of criteria, said third set of criteria being different from said fourth set of criteria, said first data being a subset of said second data, said third data being a subset of said fourth data, and
        a coordinating agent, said coordinating agent being configured to receive processed data from said plurality of intelligent agents,
    wherein said each intelligent agent of said plurality of intelligent agents includes a cache, said cache being configured to include code for saving at least a data file in order to enable data latching.

10. The article of manufacture of claim 9 wherein said server includes a set of provisional agents, said set of provisional agents being configured to include code for performing recipe management, said recipe management including code for distributing at least part of a recipe to at least one of said plurality of intelligent agents and said coordinating agent.

11. The article of manufacture of claim 10 wherein said each intelligent agents of said plurality of intelligent agents includes intelligence for including code for defining configuration requirements for said each components of said plurality of components, said configuration requirements including criteria for sending a data file to said each intelligent agent of said plurality of intelligent agents, said criteria being based on said part of said recipe being stored locally at said each intelligent agent of said plurality of intelligent agents.

12. The article of manufacture of claim 9 wherein said each intelligent agent of said plurality of intelligent agents includes code for performing data analysis of a data file to generate a signature data, said signature data being summarized data for said data file.

13. The article of manufacture of claim 12 wherein said coordinating agent is configured to include code for receiving a signature data from each intelligent agent of said plurality of intelligent agents, said signature data being summarized data for said data file.

14. The article of manufacture of claim 13 wherein said coordinating agent includes intelligence for performing data analysis to generate a composite signature, said coordinating agent including code for employing said signature data to provide instruction to said plurality of components.

15. The article of manufacture of claim 9 wherein said server includes intelligence for performing self-discovery to identify changes to said plasma processing system, said self-discovery including code for identifying when a component of said plurality of components is being connected to said plasma processing system.

* * * * *